US012520923B2

(12) United States Patent
Wilson

(10) Patent No.: US 12,520,923 B2
(45) Date of Patent: Jan. 13, 2026

(54) HAIR CLIPPER CLEANING DEVICE

(71) Applicant: Johansen Wilson, Meriden, CT (US)

(72) Inventor: Johansen Wilson, Meriden, CT (US)

( * ) Notice: Subject to any disclaimer, the term of this patent is extended or adjusted under 35 U.S.C. 154(b) by 446 days.

(21) Appl. No.: 17/953,450

(22) Filed: Sep. 27, 2022

(65) Prior Publication Data

US 2023/0093909 A1 Mar. 30, 2023

Related U.S. Application Data

(60) Provisional application No. 63/248,652, filed on Sep. 27, 2021.

(51) Int. Cl.

*A45D 27/46* (2006.01)
*B08B 5/02* (2006.01)
*B08B 5/04* (2006.01)
*B26B 19/38* (2006.01)

(52) U.S. Cl.

CPC ................ *A45D 27/46* (2013.01); *B08B 5/02* (2013.01); *B08B 5/04* (2013.01); *B26B 19/3833* (2013.01)

(58) Field of Classification Search

CPC ...................................................... A45D 27/46
See application file for complete search history.

(56) References Cited

U.S. PATENT DOCUMENTS

| | | | | |
|---|---|---|---|---|
| 4,029,115 | A * | 6/1977 | Wheeler | B08B 3/006 134/111 |
| 8,225,804 | B2 * | 7/2012 | Publ | B08B 3/102 134/84 |
| 8,347,455 | B2 * | 1/2013 | Dyson | A47L 9/2857 15/327.2 |

* cited by examiner

*Primary Examiner* — Jason Y Ko

(74) *Attorney, Agent, or Firm* — Willie Jacques; Emanus, LLC

(57) ABSTRACT

A maintenance device for maintaining a hair clipper includes a housing that has a shell that defines an interior area. One or more ports extend through the shell and into the interior area. The maintenance device includes a cleaning station disposed in the interior area and accessible via the port. The cleaning station is configured to remove hair fragments from the hair clipper. The maintenance device includes an applicator station disposed in the interior area and accessible via another port. The applicator station is configured to apply a substance to the hair clipper.

12 Claims, 8 Drawing Sheets

HAIR CLIPPER CLEANING DEVICE

CROSS REFERENCE TO RELATED APPLICATION

This application claims priority to commonly owned U.S. Provisional Patent Application Ser. No. 63/248,652 filed Sep. 27, 2021, the entirety of which is incorporated herein by reference.

FIELD OF THE INVENTION

This invention relates to a cleaning device for cleaning, sanitizing, lubricating, and charging a hair clipper.

BACKGROUND

Hair stylists use electric hair clippers (e.g., trimmers) which are specialized implements used to cut human head hair. Hair clippers use a vibrating motor that moves the blade at a high resonant frequency. The blades accumulate cut hair fragments which leads to wear and degradation of the hair clipper over time. The hair fragments can contaminate the hair clippers by carrying germs and microorganisms, especially one which causes diseases. With the spread of COVID 19, transmission of germs and microorganisms via hair clippers is of a growing concern.

Hair stylists maintain their profitability by being able to maximize the number of people they can cut hair for over a given period of time. However, the hair stylists' efficiency is reduced by the need to clean, sanitize and lubricate the hair clippers. Such cleaning, sanitizing, and lubricating is typically accomplished with devices that tend to cause the hair fragments along with any germs and microorganisms to become airborne. Moreover, health codes require sanitization of the hair clipper after use with each person.

Thus, there is a need for an improved device for cleaning, sanitizing and lubricating hair clippers that addresses the foregoing problems.

SUMMARY

The present invention includes a maintenance device for maintaining a hair clipper including a housing that has a shell that defines an interior area. One or more ports extend through the shell and into the interior area. The maintenance device includes a cleaning station disposed in the interior area and accessible via the port. The cleaning station is configured to remove hair fragments from the hair clipper. The maintenance device includes an applicator station disposed in the interior area and accessible via another port. The applicator station is configured to apply a substance to the hair clipper.

In some embodiments, the cleaning station includes one or more gas supply sources in communication therewith. The gas supply source is configured to impart a gas, preferably air, onto the hair clipper to remove hair fragments therefrom.

In some embodiments, the cleaning station includes a reservoir for containing hair fragments removed from the hair clipper.

In some embodiments, the cleaning station includes a vacuum source for suctioning hair fragments from the hair clipper.

In some embodiments, the gas supply includes one of a compressor, a blower and/or a canister of a pressurized gas.

In some embodiments, the applicator station includes one or more storage vessels (e.g., a pressurized canister) containing a lubricant and/or a sanitizing agent.

In some embodiments, the applicator station includes a conveying device in communication with the storage vessel and the applicator station. The conveying device is configured to transfer the lubricant and sanitizing agent onto the hair clipper.

In some embodiments, the cleaning station and/or the applicator station is remotely operated, preferably by a remote control, foot pedal or a button.

In some embodiments, the cleaning station and the applicator station are in separate ports.

In some embodiments, the cleaning station and the applicator station are housed in an enclosure that is removably disposed on the housing.

In some embodiments, the housing is manufactured from a plastic material.

In some embodiments, the housing further includes a door and/or a drawer which provide access to the interior area of the housing.

DETAILED DESCRIPTION

Figure 1:
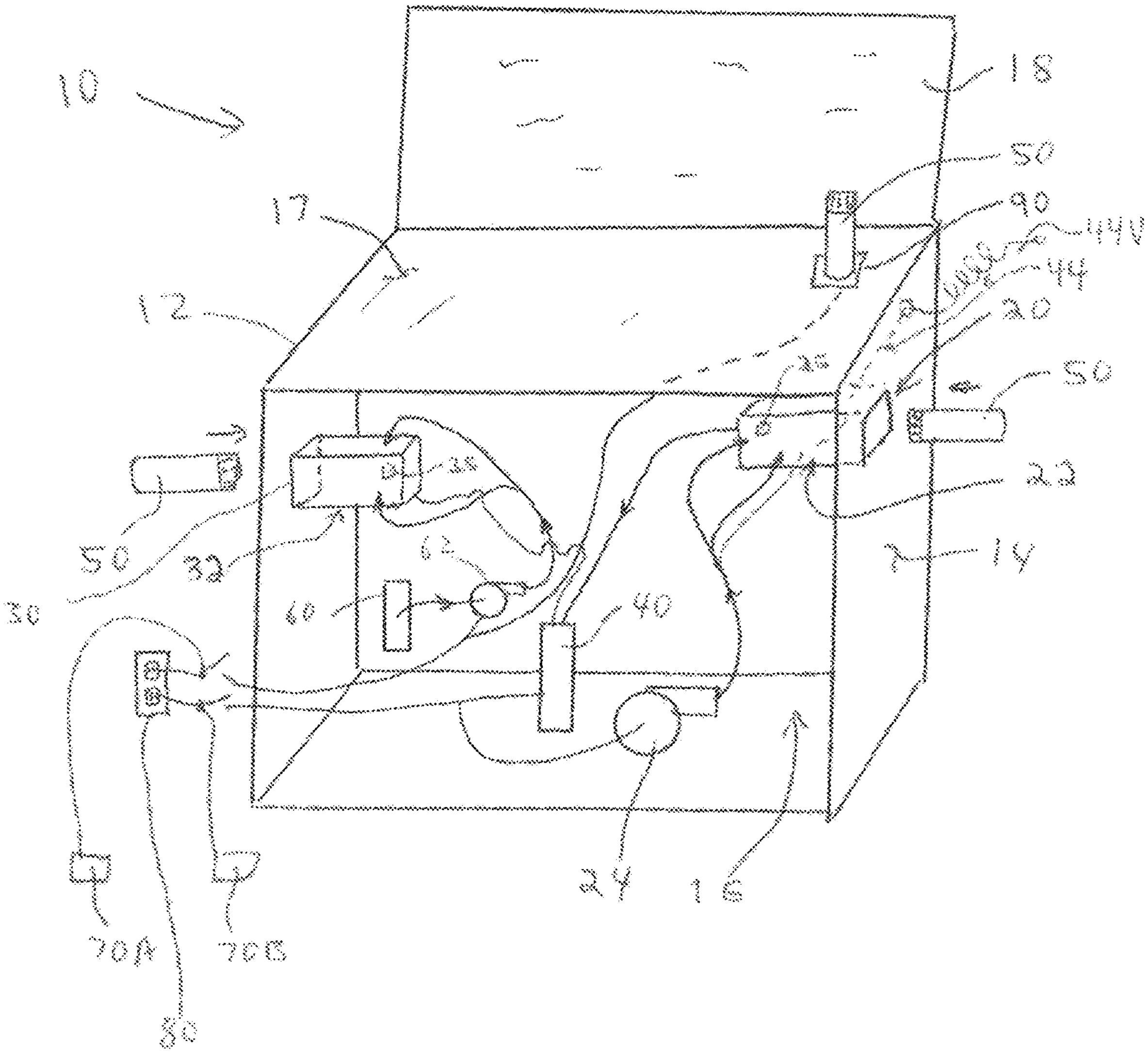
FIG. 1 is a perspective view of the maintenance device for maintaining a hair clipper of the present invention.

As shown in FIG. 1, a maintenance device for maintaining (e.g., cleaning, charging and sanitizing) a hair clipper is generally designated by the numeral 10. The maintenance device 10 includes a housing 12 having a shell 14 that defines an interior area 16. The housing 12 has a horizontal working surface 17 for placing hair cutting devices and equipment. A mirror 18 is mounted vertically to the housing 12. In some embodiments, the housing 12 is manufactured from a plastic material. In some embodiments, the housing 12 is manufactured from a metallic material. In some embodiments, the housing 12 is manufactured from a combination of one or more plastic materials and one or more metallic materials. While the maintenance device 10 is shown and described for maintaining a hair clipper, the present invention is not limited in this regarding as the maintenance device 10 is configured to maintain other devices, including but not limited to combs, scissors, cell phones, tools, keys, handheld devices, beverage cans, eating utensils, and food containers.

A first port 20 extends through the shell 14 and into the interior area 16. For example, in FIG. 1 the first port 20 is shown extending through the shell 14 on the right-hand side of the housing 12. However, the present invention is not limited in this regard as the first port 20 may extend through the shell 14 in any other location including the front side (see FIGS. 2 and 3), the left-hand side and the top of the housing 12. A cleaning station 22 is disposed in the interior area 16 and accessible via the first port 20. The cleaning station 20 is configured to remove hair fragments from the hair clipper 50. The first port 20 is sized to receive the hair clipper 50 for cleaning the hair clipper 50.

Figure 2:
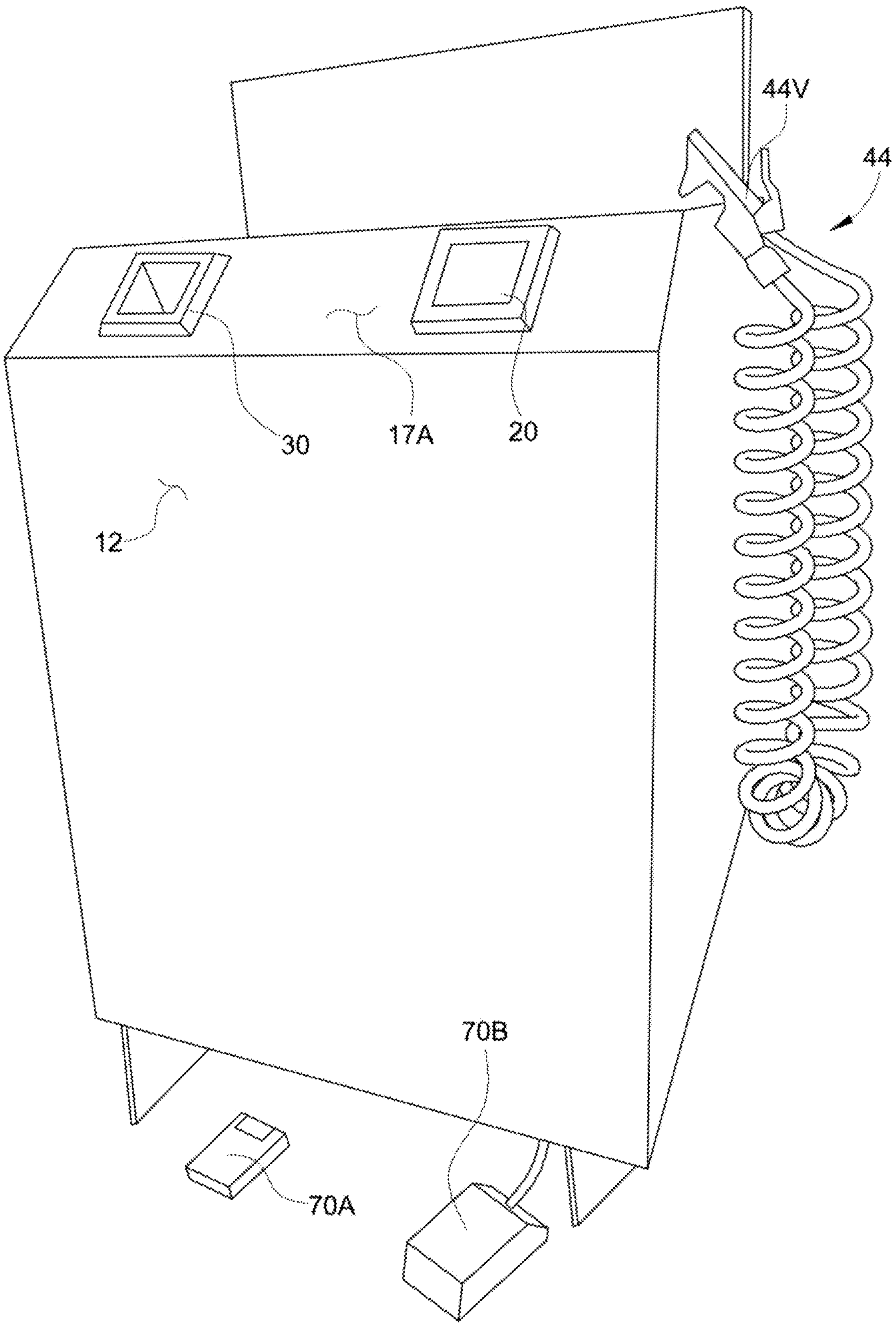
FIG. 2 is a photograph of the device of the present invention.

The maintenance device 10 includes an applicator station 32 disposed in the interior area 16 and accessible via a second port 30. For example, the second port 30 is shown extending through the shell 14 on the left-hand side of the housing 12. However, the present invention is not limited in this regard as the second port 30 may extend through the shell 14 in any other location including the front side (see FIGS. 2 and 3), the right-hand side and the top of the housing 12. The applicator station 32 is configured to apply one or more substances to the hair clipper 50. The second port 30 is sized to receive the hair clipper 50 for applying a lubricant and/or sanitizing agent (e.g., an ethyl alcohol or isopropyl alcohol based disinfectant, sodium hypochlorite, hydrogen peroxide or an virucidal agent) to the hair clipper 50. The sanitizing agent is configured to chemically destroy germs, bacteria and particles containing influenza, COVID, lipophilic viruses or other diseases. In some embodiments, the sanitizing agent is an ultraviolet (UV) light source configured to inactivate and destroy germs, microbes, bacteria and particles containing influenza, COVID or other diseases The cleaning station 22 includes a gas supply source 24 in communication therewith. The gas supply source 22 is configured to impart a gas, preferably air, onto the hair clipper 50 when positioned in the cleaning station 22 through the first port 20, to remove hair fragments therefrom. The cleaning station 22 includes a reservoir 40 for containing hair fragments removed from the hair clipper 50 and deposited in the cleaning station 22. In some embodiments, the reservoir includes a vacuum for suctioning hair fragments from the hair clipper 50. In some embodiments, the gas supply 24 is a compressor, a blower and/or a canister of a pressurized gas, for supplying a gas such as air or nitrogen to the cleaning station 22. As best shown in FIG. 2, an auxiliary line 44 (e.g., flexible hose coil or retractable hose reel) is in communication with the gas supply source 24 or a vacuum. The auxiliary line 44 has a valve 44V positioned in a terminal end thereof. The auxiliary line 44 and valve 44V have utility in further cleaning of the maintenance device 10, the hair clipper 50 and hair cutting devices and equipment.

As shown in FIG. 2, the housing 14 includes a sloped surface 17A that extends between the horizontal working surface 17 and the front of the housing 12. The first port 20 and the second port 30 extend through the sloped surface 17A, and the cleaning station 22 and the applicator station 32 are oriented generally perpendicular to the sloped surface 17A to urge hair fragments and excess fluids to slide to a bottom portion of the respective one of the cleaning station 22 and the applicator station 32, where they can be removed via a suitable discharge device such as the reservoir 40.

Figure 3:
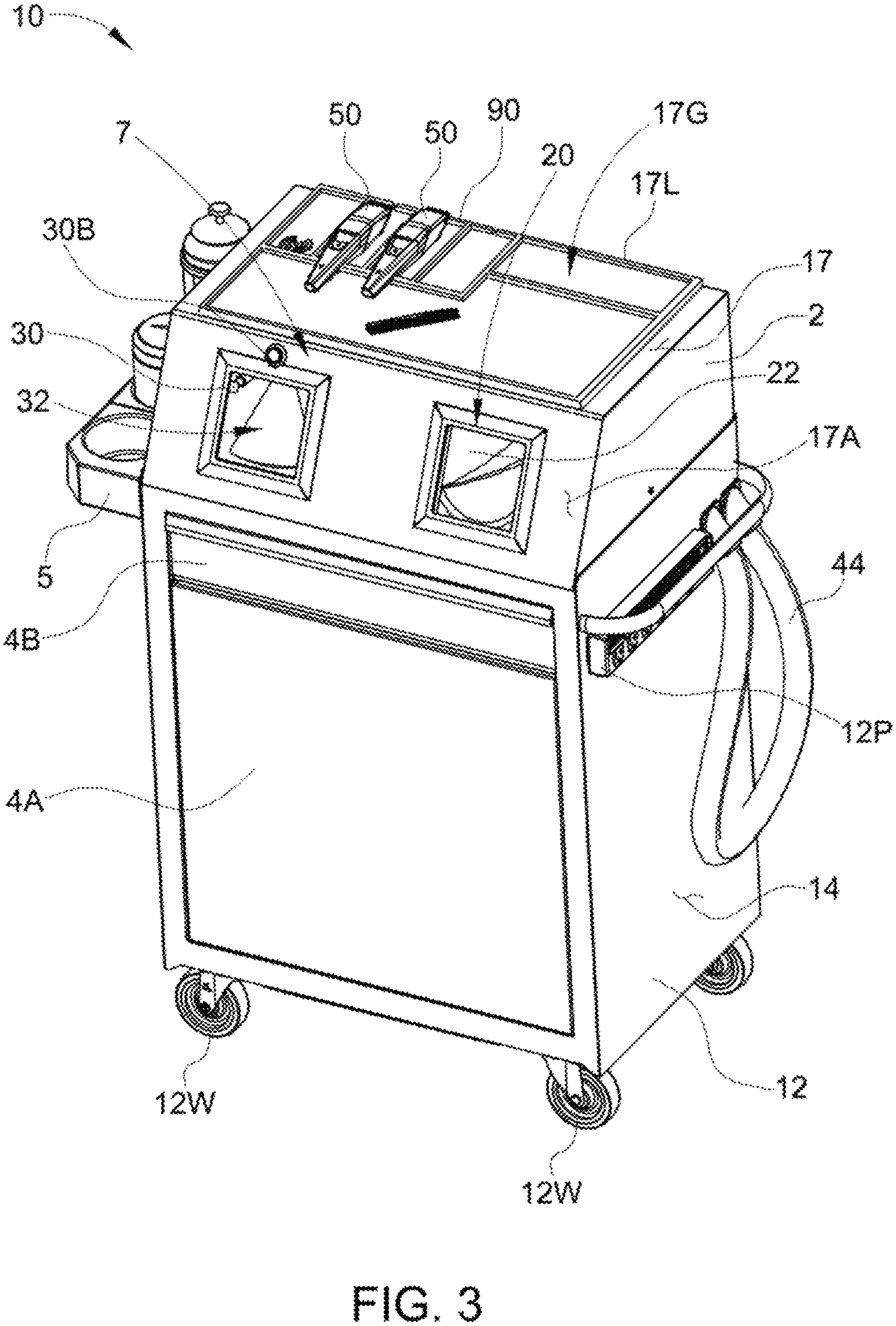
FIG. 3 is a perspective view of another embodiment of the maintenance device for maintaining a hair clipper of the present invention.
Figure 4:
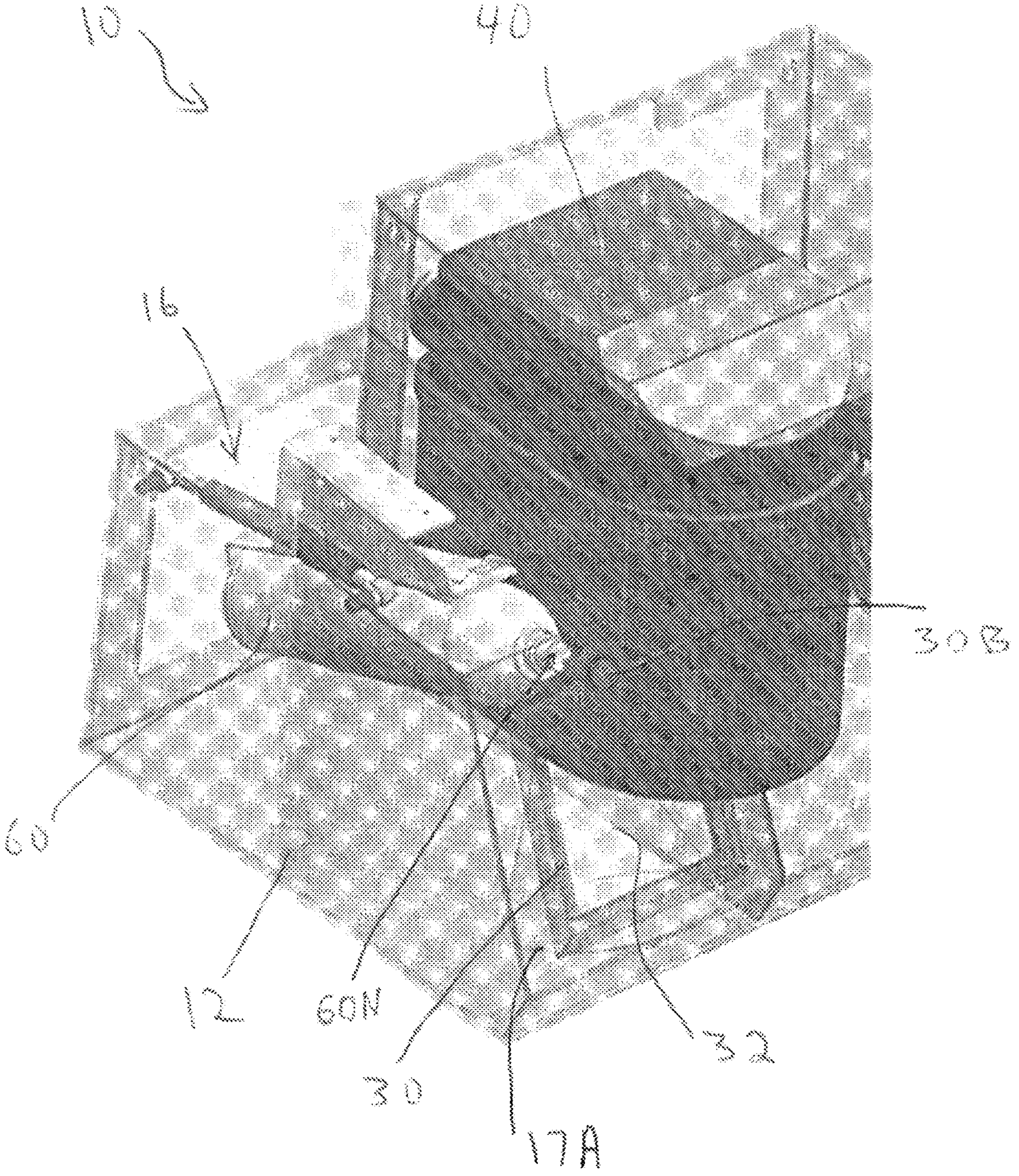
FIG. 4 is a perspective phantom view of a portion of the inside of the maintenance device for maintaining a hair clipper of the present invention.
Figure 5:
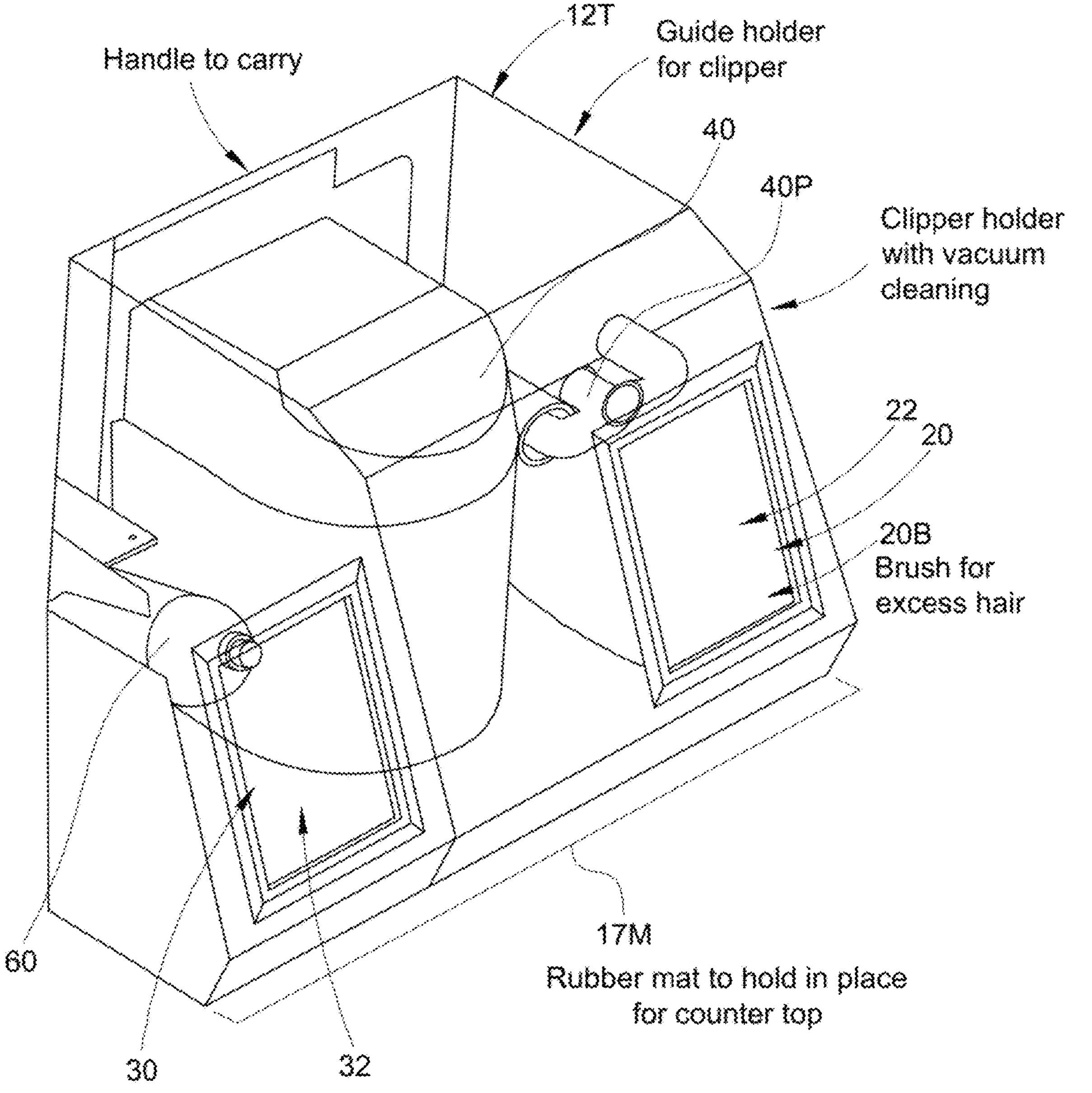
FIG. 5 is a perspective phantom view of a portion of the inside of the maintenance device for maintaining a hair clipper of the present invention.

The applicator station 32 includes a storage vessel 60 that contains a fluid such as a lubricant and/or a sanitizing agent. The applicator station 32 includes a conveying device 62 such as a pump that is in communication with the storage vessel 60 and the applicator station 32. The conveying device 62 is configured to transfer the lubricant and sanitizing agent onto the hair clipper 50 when the hair clipper is positioned in the applicator station 32 via the second port 30, to apply (e.g., spray) the lubricant and/or sanitizing agent onto the hair clipper 50. The applicator station 32 is in communication with the reservoir 40 to remove excess fluids accumulated in the applicator station 32. As shown in FIGS. 3 and 4, the conveying device 60 is a replaceable canister that contains the lubricant and/or sanitizing agent under pressure. The canister includes a spray nozzle 60N that is configured to spray the lubricant and/or sanitizing agent on the hair clipper 50. In some embodiments, the spray nozzle 60N is activated by a button 20B located proximate the second port 30. The conveying device 60 (i.e., canister) can be removed when it is empty and a full conveying device 60 (i.e., canister) can be installed in the interior area 16.

The cleaning station 22 and the applicator station 32 are remotely operated, preferably by a foot pedal or a button 70A, 70B that is in communication with a power supply 80 and the cleaning station 22 and the applicator station 32.

While the cleaning station 22 and the applicator station 32 are accessible via separate ports (i.e., the first port 20 and the second port 30, respectively), the present invention is not limited in this regard as the cleaning station 22 and the applicator station 32 may be accessible via a single common port.

The cleaning station 22 and the applicator station 32 each have a sensor 25, 35, respectively, that senses, positions and indicates proper positioning of the hair clipper 50 in the cleaning station 22 and the applicator station 32. In some embodiments, the sensor 25 activates the gas supply source 24 or vacuum. In some embodiments, the sensor 35 activates the conveying device 62 to transfer the lubricant and sanitizing agent from the storage vessel 60 onto the hair clipper 50. In some embodiments, the sensors 25 and 35 are motion sensors.

In some embodiments, the maintenance device for maintaining a hair clipper 10 includes a charging station 90 located on the horizontal working surface 17 and in communication with the power supply 80. The charging station 90 is configured to charge or power the hair clipper 50. In some embodiments, the charging station 90 is formed integral with the housing 12. In some embodiments, the charging station 90 is formed integral with the horizontal working surface 17.

Figure 6:
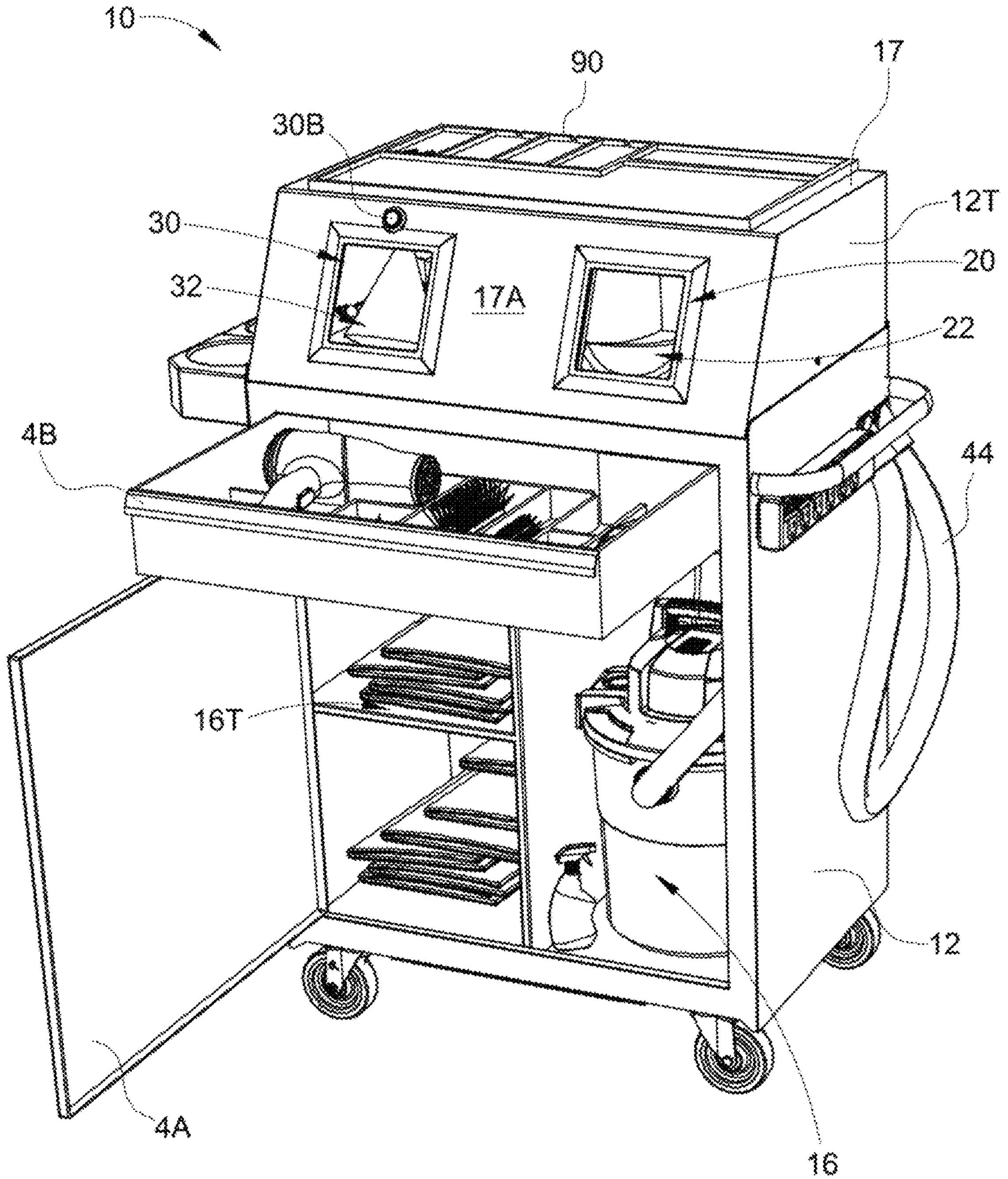
FIG. 6 is a perspective view of the perspective phantom view of the maintenance device for maintaining a hair clipper of the present invention shown with a drawer and door open.
Figure 7:
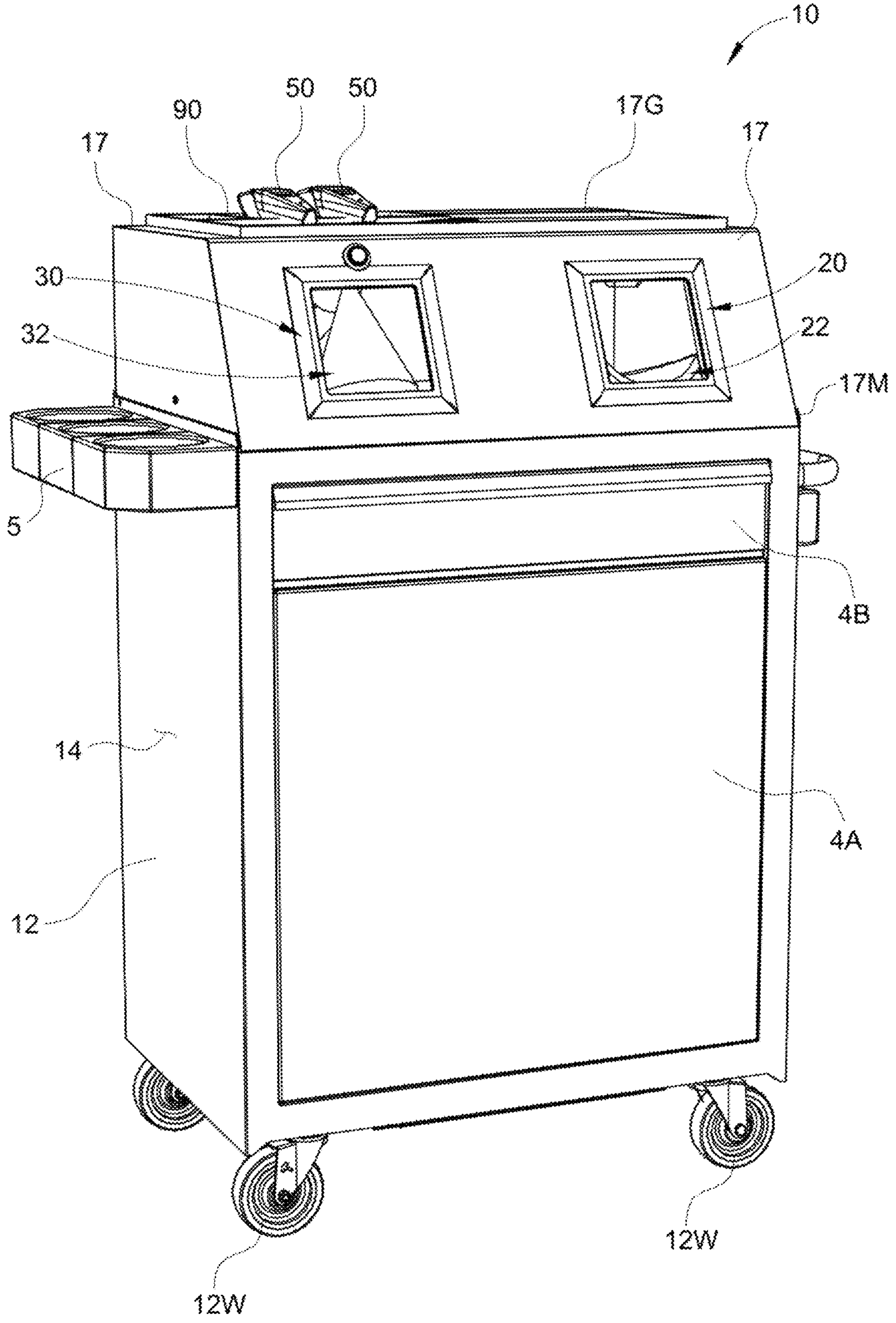
FIG. 7 is a perspective view of the perspective phantom view of a portion of the maintenance device for maintaining a hair clipper of the present invention shown with a drawer and door closed.
Figure 8A:
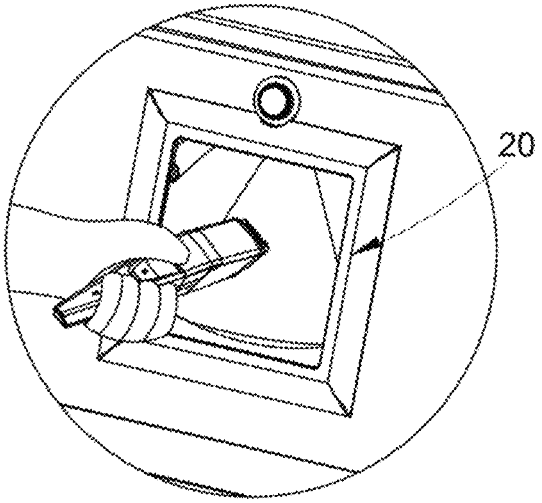
FIG. 8A is an isolated view of a cleaning station of FIG. 7.
Figure 8B:
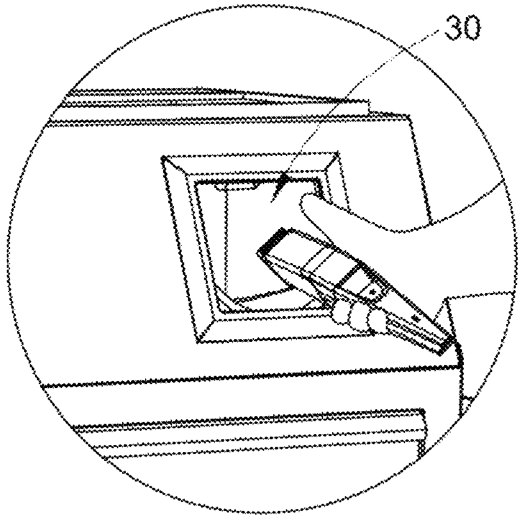
FIG. 8B is an isolated view of an applicator station of FIG. 7.
Figure 8C:
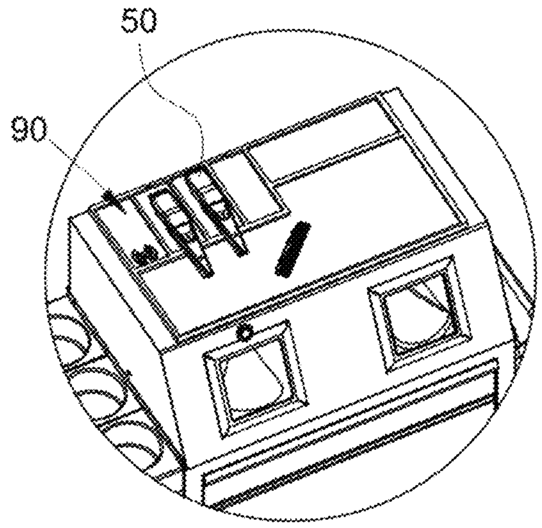
FIG. 8C is an isolated view of the charging station of FIG. 7.
Figure 8D:
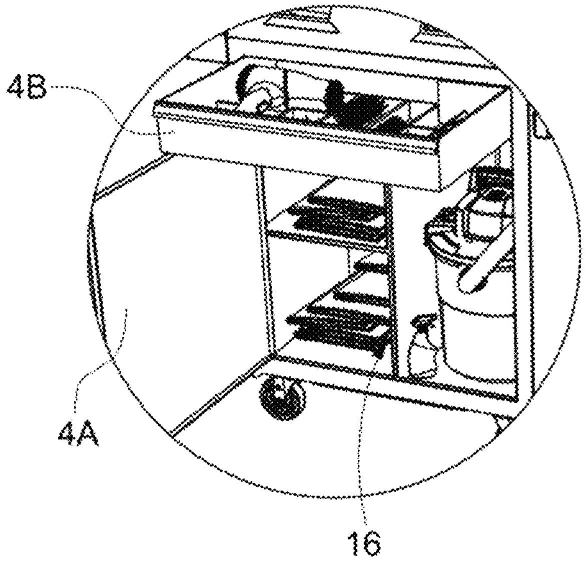
FIG. 8D is a perspective view of a portion of the interior area of the maintenance device for maintaining a hair clipper of FIG. 7

While the cleaning station 22 and the applicator station 32 are shown and described as being positioned in ports 20 and 30, respectively, in the housing 12, the present invention is not limited in this regard as the cleaning station 22 and the applicator station 32 may be configured as a separate compact stand-alone assembly, for example that is shelf or wall mounted. For example, as shown in FIG. 3 the cleaning station 22 and the applicator station 32 are housed in an enclosure 2 that is positioned on the housing 12. An anti-slip mat 17M is disposed between the enclosure 2 and the housing 12 to assist in securing the enclosure 2 to the housing 12. As shown in FIG. 3, the enclosure 2 includes a sloped front face 7 in which the first port 20 and the second port 30 extend through. In some embodiments the housing is mounted on wheels 12W to facilitate repositioning of the maintenance device for maintaining a hair clipper 10. As shown in FIGS. 3, 6 and 7 the housing 12 includes a door 41 that is mounted to the housing on hinges to provide access to the interior area 16 of the housing 12. In some embodiments, the interior includes shelves 16T (see FIG. 6). In some embodiments, the housing 12 includes a drawer 4B that is slidable into and out of the housing 12. In some embodiments, the housing 12 includes a power supply 12P mounted thereto as shown in FIG. 3. In some embodiments, the housing 12 includes an exterior shelf 5 mounted to a side thereof.

As shown in FIG. 3 a platform 17G that has a lip system 17L thereon is disposed on the top surface 17 to provide containment for articles such as the hair clipper 50 on the platform 17G. In some embodiments, the platform 17G includes the charging station 90.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A maintenance device for maintaining a hair clipper, the maintenance device comprising:

a housing having a shell that defines an interior area, at least one port extending through the shell and into the interior area;

a cleaning station disposed in the interior area and accessible via the at least one port, the cleaning station being configured to remove hair fragments from the hair clipper;

an applicator station disposed in the interior area and accessible via the at least one port, the applicator station being configured to apply at least one substance to the hair clipper, wherein the applicator station comprises at least one storage vessel containing at least one of a lubricant and a sanitizing agent; and wherein each of the cleaning station and the applicator station comprises a sensor to sense, position, and indicate positioning of the hair clipper in the cleaning station and the applicator station, respectively.

2. The maintenance device of claim 1, wherein the cleaning station comprises at least one of a gas supply source in communication therewith, the gas supply source being configured to impart a gas, preferably air, onto the hair clipper to remove hair fragments therefrom.

3. The maintenance device of claim 1, wherein the cleaning station comprises a reservoir for containing hair fragments removed from the hair clipper.

4. The maintenance device of claim 1, wherein the cleaning station comprises a vacuum source for suctioning hair fragments from the hair clipper.

5. The maintenance device of claim 3, wherein the cleaning station comprises a vacuum source for suctioning hair fragments from the reservoir.

6. The maintenance device of claim 2, wherein the gas supply comprises at least one of a compressor, a blower and a canister of a pressurized gas.

7. The maintenance device of claim 1, wherein the applicator station comprises a conveying device in communication with the at least one storage vessel and the applicator station, the conveying device being configured to transfer the lubricant and sanitizing agent onto the hair clipper.

8. The maintenance device of claim 1, wherein at least one of the cleaning station and the applicator station is remotely operated, preferably by a foot pedal or a button.

9. The maintenance device of claim 1, wherein the cleaning station and the applicator station are in separate ports.

10. The maintenance device of claim 1, wherein the cleaning station and the applicator station are housed in an enclosure that is removably disposed on the housing.

11. The maintenance device of claim 1, wherein the housing is manufactured from a plastic material.

12. The maintenance device of claim 1, wherein the housing further comprises at least one of a door and a drawer which provide access to the interior area of the housing.

* * * * *